US011919517B1

(12) United States Patent
Wittenschlaeger

(10) Patent No.: US 11,919,517 B1
(45) Date of Patent: Mar. 5, 2024

(54) VECHICULAR CONTROL SYSTEMS FOR IMPROVED SUSTAINABILITY, SYSTEMS, APPARATUS, AND METHODS

(71) Applicant: AYRO, Inc., Round Rock, TX (US)

(72) Inventor: Thomas M. Wittenschlaeger, Sarasota, FL (US)

(73) Assignee: Ayro, Inc., Round Rock, TX (US)

( * ) Notice: Subject to any disclaimer, the term of this patent is extended or adjusted under 35 U.S.C. 154(b) by 0 days.

(21) Appl. No.: 18/066,548

(22) Filed: Dec. 15, 2022

(51) Int. Cl.
| | |
|---|---|
| *B60W 30/00* | (2006.01) |
| *B60W 10/08* | (2006.01) |
| *B60W 10/18* | (2012.01) |
| *B60W 10/20* | (2006.01) |
| *B60W 30/18* | (2012.01) |
| *B60W 40/10* | (2012.01) |

(52) U.S. Cl.
CPC ...... *B60W 30/18009* (2013.01); *B60W 10/08* (2013.01); *B60W 10/18* (2013.01); *B60W 10/20* (2013.01); *B60W 30/18172* (2013.01); *B60W 40/10* (2013.01); *B60W 2420/42* (2013.01); *B60W 2420/52* (2013.01); *B60W 2510/182* (2013.01); *B60W 2530/10* (2013.01); *B60W 2530/20* (2013.01); *B60W 2555/00* (2020.02); *B60W 2710/08* (2013.01); *B60W 2710/18* (2013.01); *B60W 2710/20* (2013.01)

(58) Field of Classification Search
CPC .......... B60W 30/18009; B60W 10/08; B60W 10/18; B60W 10/20; B60W 30/18172; B60W 40/10; B60W 2555/00; B60W 2420/42; B60W 2420/52; B60W 2510/182; B60W 2530/10; B60W 2530/20; B60W 2710/18; B60W 2710/08; B60W 2710/20
USPC ............................................................ 701/22
See application file for complete search history.

(56) References Cited

U.S. PATENT DOCUMENTS

| | | | |
|---|---|---|---|
| 2011/0295464 A1* | 12/2011 | Zagorski ............ | B62D 15/0265 701/41 |
| 2021/0229706 A1* | 7/2021 | Jones ................... | G05D 1/0061 |
| 2023/0063613 A1* | 3/2023 | Gao ...................... | B60W 50/14 |

* cited by examiner

*Primary Examiner* — Tyler J Lee
*Assistant Examiner* — Tiffany P Ohman
(74) *Attorney, Agent, or Firm* — Haynes and Boone, LLP

(57) ABSTRACT

A vehicular control system is presented where the contact patches of the vehicle have reduced impact on an environment. Vehicular control systems include force sensors and terrain sensors that provide real-time or near real-time information about the operating environment of a vehicle. The force sensor data may be used to derive one or more forces which can be used to infer the nature of the vehicles contact patches. As the vehicular control system detects changes in a terrain attribute from the terrain sensors, the vehicular control system determines what the contact patches should be to address the terrain change and determines the necessary forces to give rise to the target contact patches. The vehicular control systems may then adjust the operational parameter values of the vehicle to generate the target contact patches to thereby reduce the impact on the environment.

27 Claims, 9 Drawing Sheets

FLATBED LSV
100A

PICKUP LSV
100B

VAN BOX LSV
100C

VECHICULAR CONTROL SYSTEMS FOR IMPROVED SUSTAINABILITY, SYSTEMS, APPARATUS, AND METHODS

FIELD OF THE INVENTION

The field of the invention is vehicular technologies focused on optimizing sustainability and reducing environmental impacts.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

A great deal of technological effort has been devoted to reducing the environmental impact of vehicles, especially with respect to emissions. However, a bit less effort has been directed to vehicular sustainability, an area in which the inventors are pioneers especially in the electric Low Speed Vehicle (LSV) space. More specifically, the inventors have appreciated vehicular sustainability may be managed at a fine level of detail, which in turn generates an improved environmental impact (i.e., lessens the vehicle's environmental impact).

Not to put a too fine a point on it but managing sustainability and environmental impact is where the rubber meets the road, especially in vehicles.

One particular area of sustainability of interest to the inventors is how a vehicle directly impacts its surrounding environment, especially the terrain, due to the nature of the vehicle itself including "where the rubber meets the road." Interestingly, a great deal of effort has been directed to understanding how forces experienced by a vehicle affect a contact patch (i.e., the wheel surfaces that contact the corresponding terrain). Consider, for example, U.S. Pat. No. 8,306,697 to Lue et al. titled "Integrated Control System for Stability Control of Yaw, Roll, and Lateral Motion of a Driving Vehicle Using an Integrated Sensing System with Pitch Information," filed Feb. 7, 2011. Lu describes a sensor system to monitor how a contact patch may experience slippage. While Lu and other similar techniques focus on the nature of how vehicle's wheels grip the surface, they fail to appreciate how to control a contact patch to manage sustainability and/or environmental impact effectively.

Contact patches may vary from vehicle to vehicle, but also from wheel to wheel. Further, an individual contact patch's state might be applicable to one type of terrain, say sand, but might not be applicable to another type of terrain, say pavement. One problem with the lack of management of contact patches is that they may disturb the underlying terrain unnecessarily and thereby reduce sustainability or environmental friendliness of the vehicle. The inventors have appreciated, as described below in the inventor's own work, that controlling a contact patch of a wheel can improve a vehicle's sustainability by monitoring changes in terrain. As terrain changes, the nature of the contact patch should change as well to ensure the environmental impact of the vehicle is reduced. Thus, there remains a need for controlling a vehicle to ensure it has improved sustainability as the vehicle shifts from one type of terrain to another.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The inventive subject matter provides apparatus, systems and methods in which a vehicular control system manages forces experienced by a Low-Speed Vehicle (LSV) when the LSV encounters a terrain change, especially when contact surfaces shift from one terrain to another. The vehicular control system manages a shift from a first operational state of the vehicle for a particular terrain type to a new or different operational state of the vehicle for a new terrain type to ensure contact patches of the LSVs wheels have reduced impact on the environment (or maintaining a desirable impact level, such as within a predetermined range of impacts, on the environment). In some embodiments, the inventive subject matter includes a vehicular control system comprising sensors, vehicular controllers, at least one computer readable memory, and at least one processor. The elements of the vehicular control system may be communicationally interconnected via one or more bus, possibly including a CAN bus or other local area network. Upon execution of software instructions stored in the computer readable memory the at least one processor may execute one or more operations. Operations may include deriving a set of forces experienced by the LSV based on input from the sensors (e.g., force sensors, accelerometers, gyroscopes, piezoelectric sensors, etc.). Further, the operations may also include determining one or more contact patch state of at least one wheel of the LSV based on the set of forces. The contact patch state can be considered to represent how the current operational state of the vehicle is directly or even indirectly impacting the environment. The operations may further include identifying at least one change in a terrain attribute (e.g., type of terrain, location, condition of the terrain, etc.) based on one or more sensor input representing terrain data. The one or more sensors may include cameras, LIDAR, GPS, radar, etc. that can provide data representing the actual terrain condition. In some embodiments, the one or more sensors may also include tire pressure sensor, tire slippage sensor, touch sensor, etc. that can provide information that can be used to derive the terrain attributes. The change in terrain attribute informs the control system to determine how the vehicle should operate so that the LSV's contact patches may have an appropriate impact on the environment as the LSV shifts from on terrain to another. The operations may proceed to include defining a set of target contact patch states in response to the terrain attribute, where the target contact patch states represent the desired appropriate impact, which is intended to reduce damage to the environment. Continuing with the operations, the operations further include using the target contact patch states to determine a set of target forces that the vehicle should operate under to achieve the target contact patch states, at least to within acceptable range. Once the set of target forces are determined, the operations proceed to obtain a set of current operational values of the vehicle from the controllers or other operational data sources and to generate a set of target operational values that would, at least to within satisfaction criteria, generate the set of target forces. The set of current operational parameters reflect the current forces experienced by the LSV before or during the detected change in the terrain attribute, and the set of target operational parameters reflect the target forces under which the vehicle should operate after the LSV experiences the shift in terrain due to the detected change in the terrain attribute. Further, the two sets of operational parameters exist within a multi-dimensional operational parameter space and are also stored in the at least one computer readable memory.

The vehicle may then transition from the set of current operational parameter values to the set of target operational parameter values by identifying a path from the current set to the target set where the path is within the multi-dimensional operational parameter space. The operations may further include identifying or deriving the path where the path is defined based on derivatives of the operational parameters to thereby create a smooth, low impact shift in the contact patch states as the terrain transition occurs or in response to the terrain transition occurring. The operations may then include instructing the various controllers of the vehicle to alter their operational parameters according to the defined path. The set of operations may occur in real-time, or may be continuously repeated as practical for the LSV.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
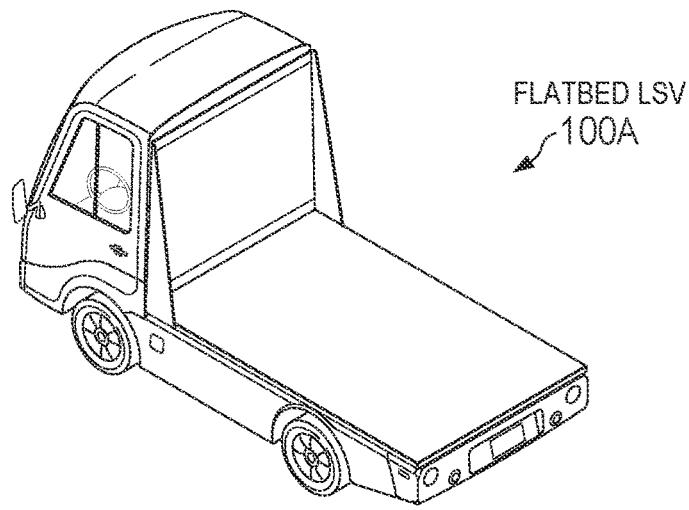
FIG. 1 provides examples of Low-Speed Vehicles (LSVs) in which the inventive subject may be deployed.
Figure 1:
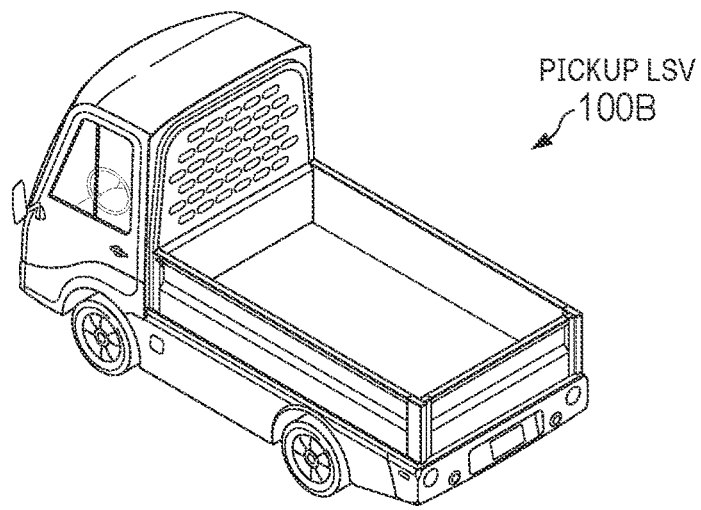
Figure 1:
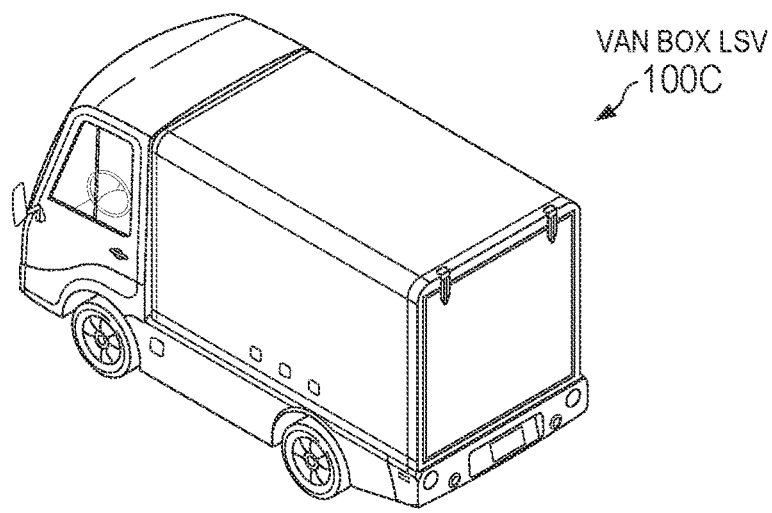

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, CAN, LAN, WAN, VPN, or other type of packet switched network; a circuit switched network; cell switched network; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

One should appreciate that the disclosed techniques provide many advantageous technical effects including managing the contact patches of one or more vehicle wheels when a terrain change is discovered as evidenced by a detected change in at least one terrain attribute. Further, management of the contact patches includes managing the shift of at least one contact patch state to another so the contact patch shift from one state to another state reduces the impact on the environment, especially with respect to terrains on which the vehicle is operating.

The focus of the disclosed inventive subject matter is to enable construction or configuration of a computing device to operate on vast quantities of digital sensor data beyond the capabilities of a human, especially in real-time or at least near real-time in an LSV context. Although the digital data represents various operational states of a vehicle (e.g., terrain, contact patches, forces, speed, acceleration, loading, etc.), it should be appreciated that the digital data is a representation of one or more digital models of the operational states. By instantiation of such digital models, possibly according to object-oriented programming techniques, in the memory of the computing devices, the computing devices are able to manage the digital data or digital models in a manner that could provide utility to a user of the computing device that the user would lack without such a tool, including altering the operational features of a vehicle to ensure reduced impact on the physical environment.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject is considered to include controlling the operational parameters of a vehicle to ensure the contact patches of the vehicle's wheels have reduced impact on the environment's terrain, especially when the vehicle shifts from one operational state for a specific terrain type to another operational state based on a detected or sensed change in the terrain. While the disclosed inventive subject matter is described in the context of LSVs, especially electric LSVs, and LSV tires, one should appreciate the techniques may also be generalized to other arenas. For example, other types of vehicles that may benefit from the disclosed techniques may include military vehicles, trucks, tractors, un-manned vehicles, wheeled robots, delivery robots, lawn mowers, or other types of ground contacting vehicles. Further, the techniques may be also used with respect to non-wheeled vehicles having different forms of contact patches including those with treads such as tanks, bulldozers, cranes, back-hoes, or other types of non-wheeled vehicles. Still further, the techniques may also be applied to other types of devices that may not be a vehicle or may not have wheels. Consider for example, robots. Robots may not have wheels at all but have appendages (e.g., arms, legs, etc.) that end in features that contact a target surface (e.g., hands, feet, etc.) where the features would have contact patches that may be managed by the disclosed techniques.

FIG. 1 presents example LSVs in which the inventive subject matter may be deployed. The LSVs of FIG. 1 include the Ayro, Inc, multi-purpose, configurable sustainable electric LSV known as the AYRO Vanish™ LSV (see URL www.ayro.com/vanish/). In the example shown, the LSV may be configured for different purposes. For example, flatbed LSV 100A may be used to haul or carry large cargo around an area; a campus or apartment complex. Pickup LSV 100B may be used to haul gardening debris or equipment around a campus. Still further van-box LSV 100C may be used to store or carry cargo that may require temperature control. In some use cases, van-box LSV 100C has been used as a mobile medical station or mobile vaccine station, for example.

In view the LSVs of FIG. 1 can take on different roles or responsibilities, it should be appreciated that the LSVs may have different environmental impacts in their operating environment. For example, flat-bed LSV 100A or pickup LSV 100B may have quite a variation of their payloads during a working day, which can then result in a high variance of contact patch states during operation through the day. On the other hand, van-box LSV 100C might not have a large variance in payload weight during a workday, which may result in low variance in contact patches during operation. Thus, FIG. 1 illustrates the varied nature of how a single LSV may generate a broad spectrum of contact patch states, especially during operation, that can impact the environment.

Figure 2:
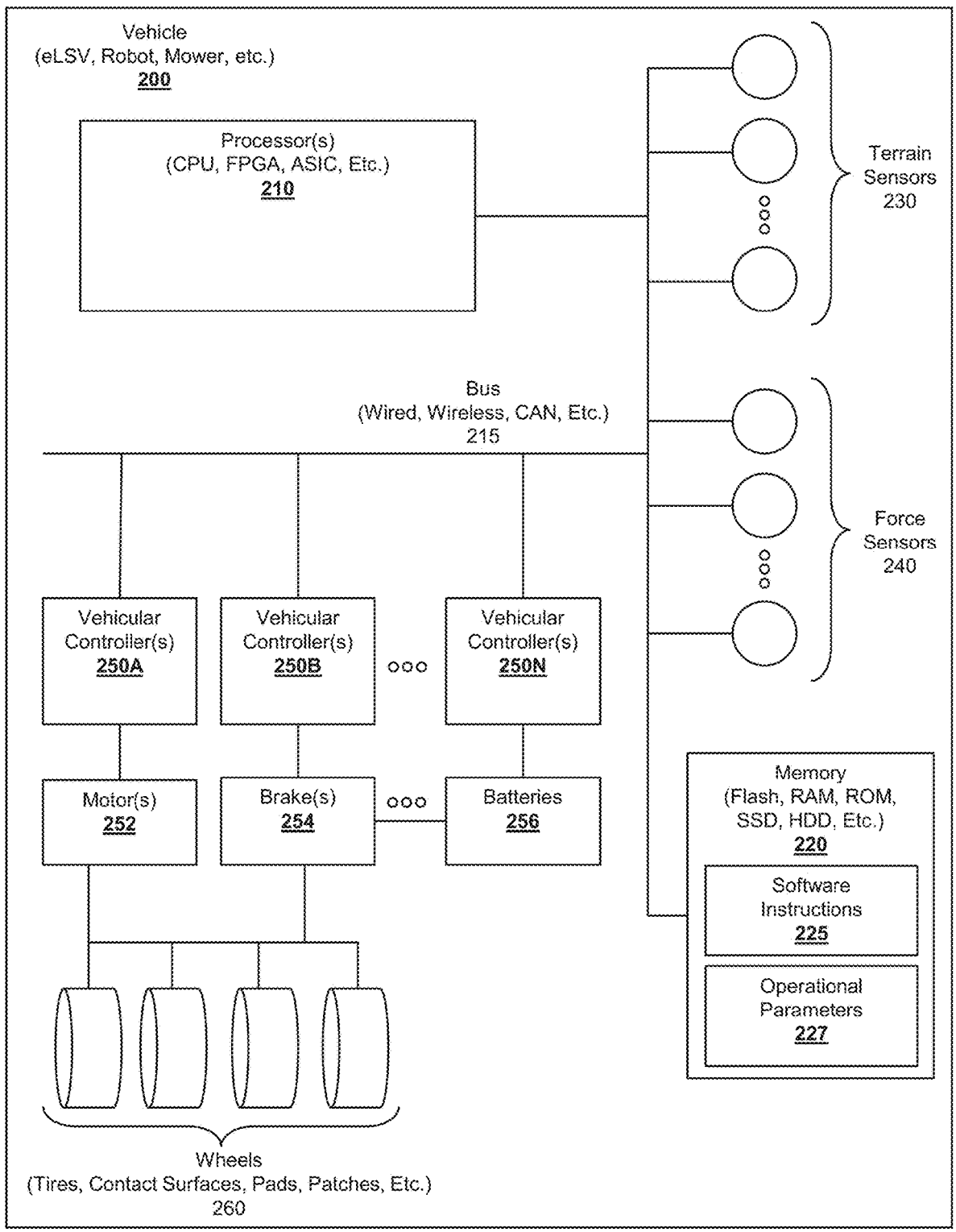
FIG. 2 illustrates a schematic of a vehicular control system.

FIG. 2 illustrates a schematic of a vehicular control system that may be deployed within vehicle 200. Vehicle 200 is outfitted with multiple computing or digital elements that facilitate the control of vehicle 200. Vehicle 200, as discussed above may include an electric LSV, but could also be other forms of mobile systems that contact a surface in an environment, possibly including a tank, SUV, rally car, RV, lawn mower, robot, farm equipment, trailer, or other type of mobile system.

Vehicle 200 is outfitted with at least one of processor 210 (e.g., CPU, ASIC, FPGA, GPU, etc.) and at least one non-transitory computer readable memory 220 (e.g., RAM, flash, HDD, SSD, etc.), which in turn stores software instructions 225 under which the processors 210 operate. Memory 220 may also store one or more operational parameters 227 and corresponding values under which the vehicle operates. Processors 210 communicatively couples with one or more sensors that provide sensor data representing a digital representation of the environment in which vehicle 200 operates. In the example shown, the sensors include at least two main sets of sensors: terrain sensors 230 and forces sensor 240. Still, other types of sensors may also be included as practical.

Terrain sensors 230 represents sensors the are used to detect one or more changes to a terrain attribute and may include a camera, LIDAR, radar, sonar, ultrasonic or other types of sensors that may be used to gain an understanding of the underlying terrain of the environment. In some embodiments an ensemble of terrain sensors 230 may be deployed for each contact patch. For example, each wheel well in vehicle 200 where wheels 260 are placed may have an ensemble of terrain sensors 230. Such an approach is considered advantageous because it provides for managing each individual contact patch separately in order to have a higher degree of environmental impact control.

Force sensors 240 represent sensors that provide sensor data that may be used to measure or determine the forces under which vehicle 200 is operating. While force sensors 240 may be used to directly measure forces (e.g., weight, gravity, etc.), force sensors 240 may also be used to indirectly measure forces. For example, an accelerometer may be used to derive various forces including gravity, centripetal forces, centrifugal forces, or the like as sensor data is obtained from the sensors. Example force sensors can include accelerometers, gyroscopes, scales, piezoelectric sensors, or other sensors whose data may be used to derive forces.

Vehicular control systems can also include one or more of vehicular controllers 250A, 250B, through 250N, collectively referred to as vehicular controllers 250. In the example shown, each controller provides control over a specific element of the vehicle. For example, vehicular controller 250A controls one or more of motors 252 that are in turn coupled to one or more of wheels 260. In some embodiments, each wheel of the vehicle may operate under control over vehicular controller 250A. However, it is also possible that motor controllers may couple to more than one wheel 260 via an axel or drive train. Vehicular controller 250B serves as the controller for one or more of brakes 254. Still further vehicular controller 250N may couple with one or more of batteries 256 as illustrated. In some embodiments, brakes 254 and batteries 256 may also electrically couple with each other directly or indirectly for regenerative braking to charge batteries 256 when the brakes are engaged. While multiple vehicular controllers 250 are illustrated, it is possible that an embodiment might include only a single controller that control each specific element of the vehicle. Still, any practical number of vehicular controllers 250 may be incorporated in vehicle 200. Controller 250 may include a motor controller, a brake controller, an air pressure controller, a battery controller, a steering controller, or other suitable controllers.

Figure 3:
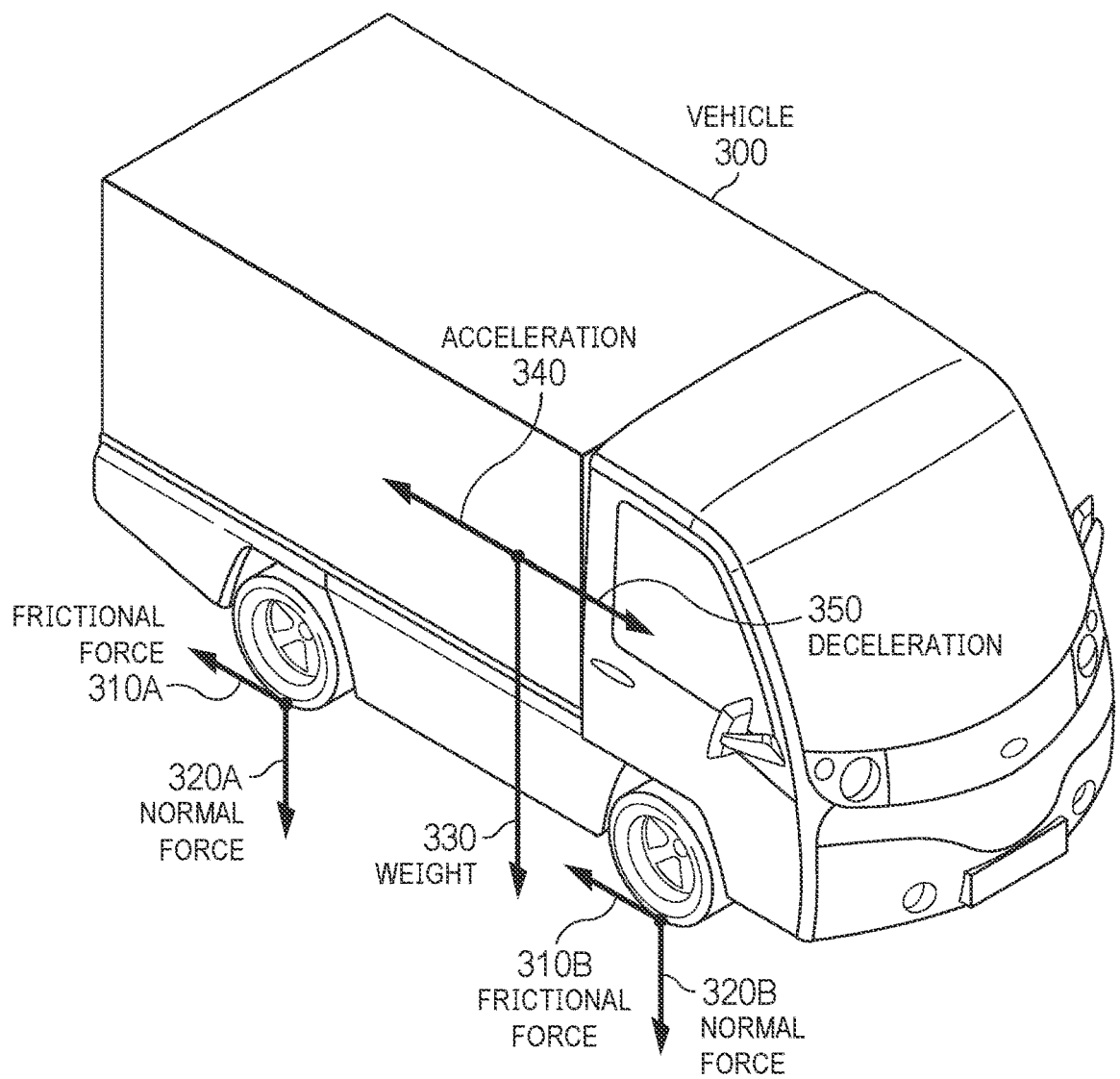
FIG. 3 illustrates example forces experienced by a vehicle and that may impact contact patches of the vehicle's wheels.

FIG. 3 presents an overview of the forces that vehicle 300, an electrical LSV in this case, may experience during typical or even atypical operation. Typically, during use, vehicle 300 may experience an acceleration force 340 or deceleration force 350 (i.e., negative acceleration) as the operator of the vehicle engages the accelerator or the brakes. These forces may be calculated from accelerometer data obtained from one or more accelerometers (e.g., force sensors, etc.). Such forces can be considered controllable forces in view they can be controlled through submitted one or more commands to a corresponding controller. In addition, vehicle 330 will also experience a weight force 330. Weight force 330 is due to gravity acting on the mass of the vehicle 300 and can be considered an ambient force. Of a particular note, weight 330 may vary with time or under different circumstances. For example, vehicle 300 may be loaded with cargo, equipment, operators, passengers of different weight, or other objects that may come and go during the operation of the vehicle. In some embodiments, it is also possible the vehicle may experience a lift force possibly due to the aerodynamic nature of the vehicular design. Additional forces may include frictional forces 310A through 310B, collectively referred to as frictional forces 310, at each contact point of the vehicle. Normal forces 320A through 320B, collectively referred to as normal forces 320, may also be specific to each wheel and represent the downward forces experienced at each contact patch. While the forces shown are represented as single vectors, one should appreciate the actual forces may be more complex in view the contact patches of the wheels are spread over an area. Thus, the collective forces may vary over the area of the contact patch (see discussion related to FIG. 4B below).

Beyond acceleration or weight related forces, vehicle 300 may also experience additional forces. For example, as vehicle 300 travels along a curved path (i.e., non-linear motion) represented by path of movement 380, vehicle 300 may also experience centripetal force 370 and centrifugal force 360. Each portion of the vehicle, especially as translated to the wheels contact patches, may experience differences in forces or differential forces due to the construction of the vehicle.

One should appreciate that all forces, even those beyond those represented in FIG. 3, may vary with time or position about vehicle 300. Thus, each contact patch of the vehicle may have different forces at play, especially when a vehicle is moving from one type of terrain to another. For example, as vehicle 300 moves about path of movement 380 and depending on the loading (e.g., position of center of mass, load balance, etc.), the contact patches of the outside wheels may have greater normal force 320 than the wheels on the inside of the path 380. Further, the various forces experienced by the contact patches will impact how the contact patch interacts with underlying surfaces, especially as the terrain of the surface changes.

One should appreciate that the forces experienced by vehicle 300 will be different between when the vehicle is at rest or in motion. At rest, several of the forces will be NULL or zero (e.g., acceleration, deceleration, friction, centripetal, centrifugal, etc.). In such a case the normal forces and weight may be the only forces experienced by vehicle 300, where the sum of the normal forces would be equal to the weight force. Still, the normal forces may be different due to weight loading or other factors and may vary from one wheel to another based on distribution of weight or contours/ tilt of the terrain. The forces may be measured or derived from the sensor data from corresponding force sensors.

Figure 4A:
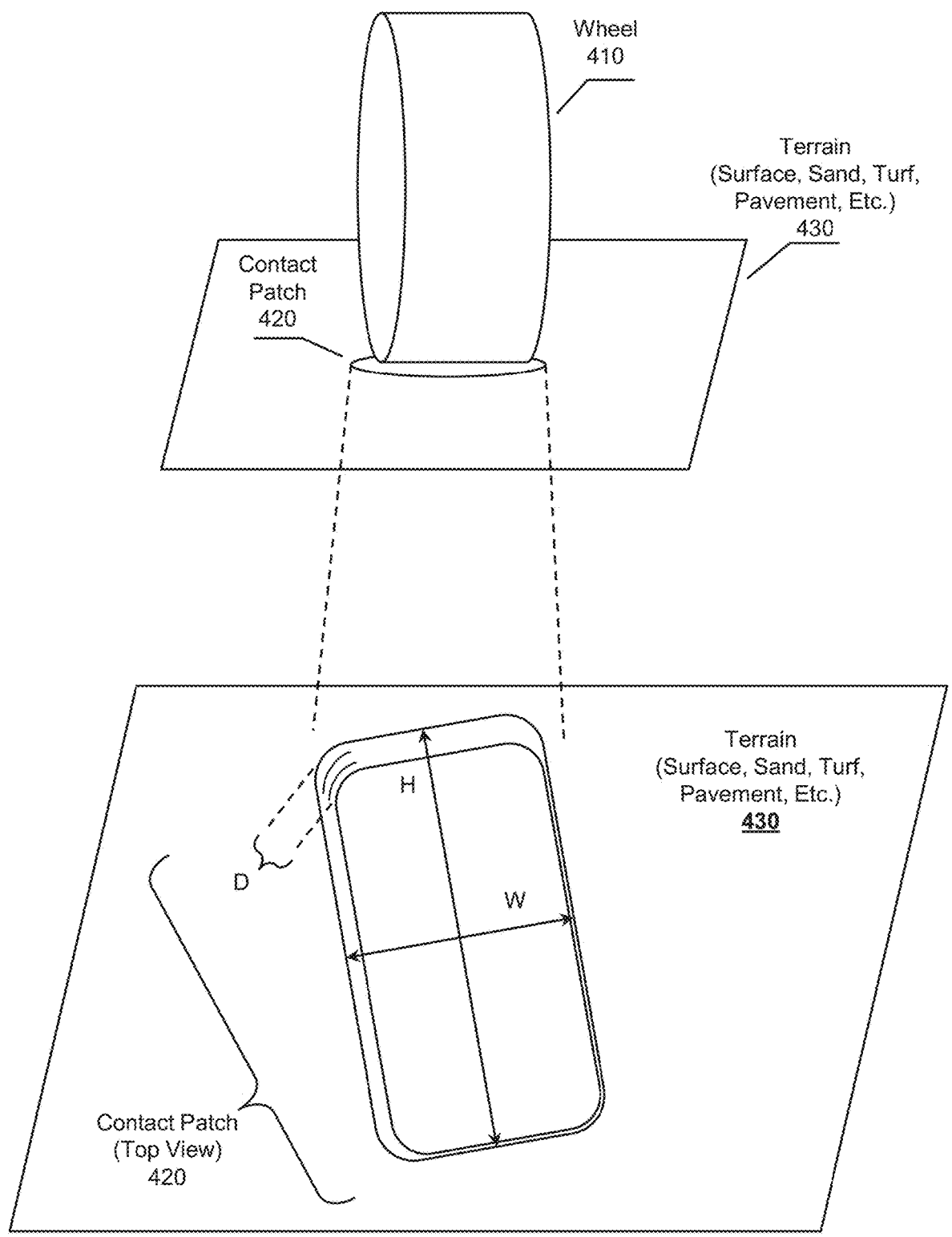
FIG. 4A illustrates the nature of a contact patch.

FIG. 4A provides additional insight in the nature of a wheel's 410 contact patch 420 while experiencing vehicular forces. In the example show, wheel 410 is contacting terrain 430 where the contacting surface of wheel 410 forms contact patch 420. Contact patch 420 is a result of the collective forces of the vehicle exerting their influence on terrain 430 via wheel 410. One should appreciate that contact patch 420 comprises at least a multi-dimensional physical impact that depends on the nature of terrain 430. Hard terrain, pavement for example, might result in contact patch 420 being, more or less, two dimensional having a height and width among other attributes. Soft terrain like sand or wet turf may also have a depth dimension resulting from the weight of the vehicle depressing into terrain 430. While contact patch 420 is represented in simple terms of height, width, and depth, it should be understood contact patch 420 may have many more complex attributes or features that contribute to the state of contact patch 420.

Figure 4B:
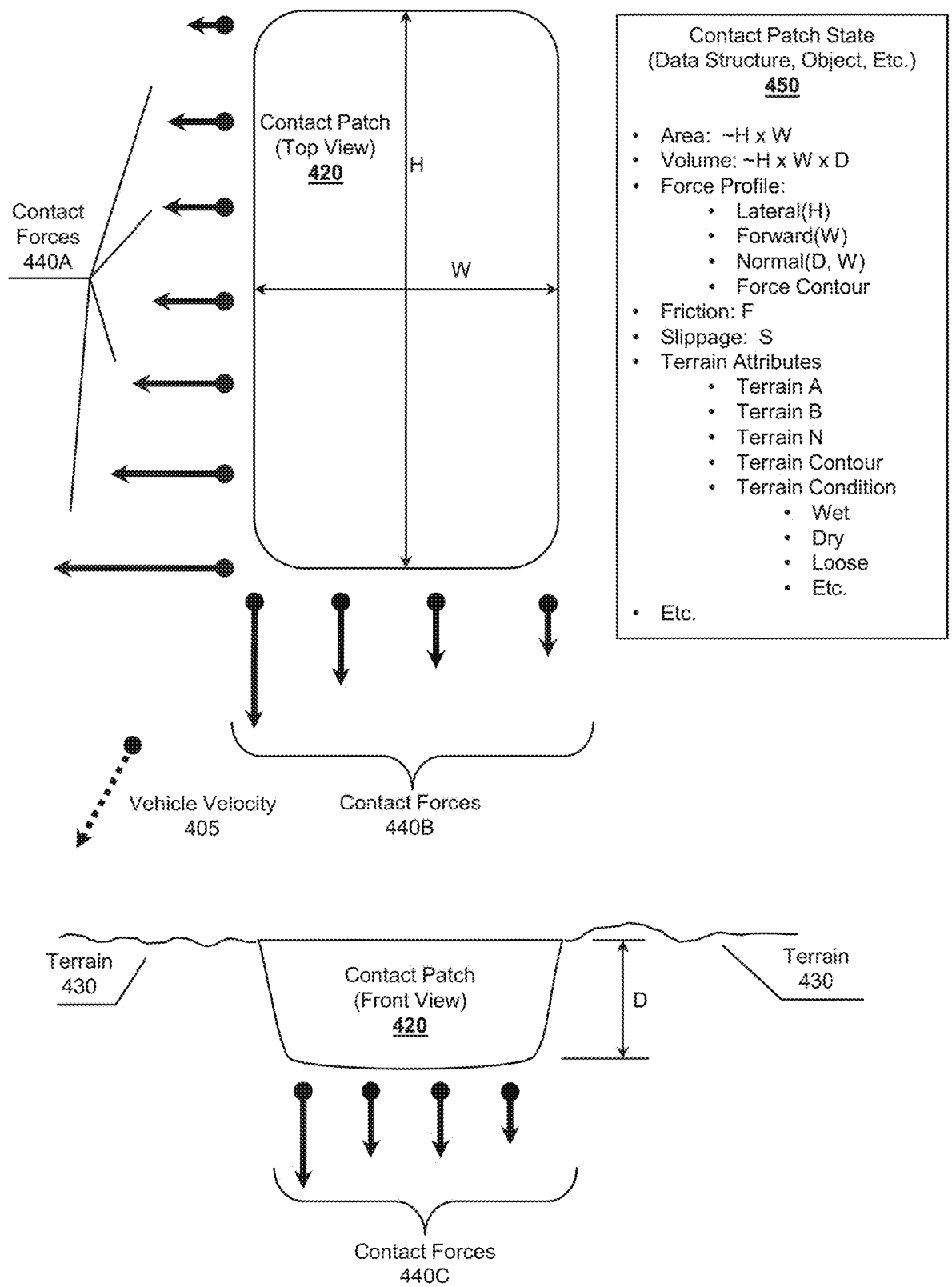
FIG. 4B provides an overview of a state of a contact patch.

FIG. 4B provides an overview of a contact patch 420 (top view) and its corresponding contact patch state 450. As can be seen, the set of forces may comprise numerous orthogonal forces relative to each other or relative to the direction of motion. First, it should be appreciated that contact patch 420 may experience many different forces at the same time rather than a single unitary force. The example presented assumes a forward movement be a vehicle in the direction of vehicle velocity 405, possibly due to the vehicle turning or sliding. As the vehicle moves, contact patch 420 will also shift its absolute location, position, orientation, or other features. Further, the force distribution may vary across contact patch 420 as illustrated. Based on velocity vector 405, contact patch 420 may have a varied set of lateral contact forces 440A as well as forces toward the front of the contact patch 420 as represented by contact forces 440B, in the direction of motion. Still, as referenced above, contact patch 420 (front view) may also have forces resulting in a depth (D) of the wheel into terrain 430, where contact force 440C may also vary across the bottom of the corresponding wheel. While contact forces 440A through 440C, collectively referred to as contact forces 440, are shown in cardinal directions, one should appreciate the contact forces may vary over the entire surface of contact patch 420 and could be represented by contours, heat maps, or other representations, which contribute to control over the contact patches and their impact on the terrain.

Of particular note, contact patch 420 can be represented in a computer readable memory as contact patch state 450, possibly instantiated according to one or more contact patch state object class definitions. Contact patch state 450 includes information about a specific contact patch. Thus, a single vehicle may have one or more contact patch state objects stored in memory representing a contact patch state 450 for each wheel, or each contacting surface. Such contact patch state objects may be instantiated in memory according to one or more class libraries defined according to the corresponding computer language or as a defined data structure definition. In view of the forces influencing contact patch 420 may vary based on time or circumstance, contact patch state 450 may also vary accordingly in near real-time or in real-time as sensor data is processed from the terrain sensors and force sensors.

Contact patch state 450 is a collection of information represented by a number of parameters and corresponding values. In the example shown, parameters can include dimensional or geometric values (e.g., height, width, depth, volume, area, a change in shape, etc.), tilt, volume displacement, force profile information (e.g., lateral forces, forward forces, normal forces, weight, force contours, force differentials, force heat maps, etc.), frictional forces, grip, slippage, or other data related to the forces. Still further, and of particular interest, contact patch state 450 may also include one or more terrain attributes, which includes information regarding terrain 430 with which contact patch 420 is contacting. Terrain attributes reflect the nature of the terrain including types of terrain, terrain-to-terrain interface boundaries, terrain conditions (e.g., ice, wet, dry, loose, etc.), or other information related to underlying terrains. One should appreciate that contact patch 420 may touch more than one terrain type. For example, a vehicle might move from turf (e.g., a golf fairway, etc.) to pavement (e.g., golf cart path, etc.) and therefore contact patch 420 might interface with more than one terrain at any given time.

The parameters of contact patch state 450, and terrain attributes, may be measured from or derived from sensor data from the various sensors disposed about the vehicle (e.g., force sensors, cameras, LIDAR, terrain sensors, etc.). In some cases, the parameters may have well defined values: "Terrain.Type:: 'TURF'", "Terrain.Condition:: 'WET'", "Force.Weight::1,000 Kgs", for example. In other scenarios, the parameter values may be estimated from the information available, possibly via a look up table, or via a callable API function. Such functions may employ trained machine learning models (e.g., neural networks, SVMs, etc.) trained on empirical data, hysteresis curves, genetic algorithms, hash table look ups, or other types of implementations. The parameters of contact patch state 450 may also adhere to a well-defined namespace or ontology to aid in development or possibly for certification of the vehicle according to regulations. One should appreciate the parameter values, while typically represented in digital form, can take on different representations based on the corresponding data. For example, the parameter values may be integers, floating point values, scaled integers from floating point values, text, Booleans, or even custom defined type definitions. Further parameter values may have different explicit units (e.g., 100 Kgs, 5 newtons, etc.) or implicit units depending on the corresponding parameter definition. For example, an elapsed time value might always be expressed in seconds (e.g., time=100, etc.). Further contact patch state 250 can also include heading information including direction of movement, rate of movement, rate of depth penetration, or other direction or vector factors that can aid in predicting where the corresponding contact patch 420 may be at a future time.

In some embodiments the contact patch state may be estimated based on information about the vehicle including the nature of the tires and the material used to make the tires. Such information may include Young modulus, stress, strain, hardness, etc. of the material, which may be fed into the callable API functions. In other cases, especially for LSVs that may be mass produced, the contact patch state 450 may be determined from taking empirical data during actual use. The empirical data may then be used to populate lookup tables for actual to estimate the contact patch state. However, it is not possible to cover all possible scenarios. Therefore, the table may be constructed for major situations and then interpolate between two or more observed vehicular states derived from the force sensors and the terrain sensors.

One should appreciate the contact patch state 450 is dependent upon the nature of the LSV itself and its other operational parameters. Thus, the contact patch state 450 is considered to be a dynamic data structure or object that changes with time or circumstances as the operational parameters of the LSV vary. For example, as the LSV operates in an environment, possibly driving around a campus, the various forces experienced by the vehicle will impact the contact patch state 450, possibly the size, shape, loading or other factors. While the example represents how the contact patch state 450 might change more or less continuously with time as the vehicle operates, there are other scenarios as well. Consider a case where the LSV is stationary or simply not moving. As passengers, cargo, or equipment are loaded in the LSV, the weight will change. As the weight changes, contact patch state 450 will also change with respect to the loading; the contact patch 420 physical dimensions may shift in size (e.g., W, H, D, etc.). One should appreciate that the forces defined in the cardinal dimensions (e.g., X, Y, Z, etc.) may be particularly useful in a low-speed vehicle space. The angle of such forces, especially with respect to the direction of motion, may create potential damage when such forces are more orthogonal relative to the direction of motion. The disclosed techniques seek to minimize such damage.

Figure 5A:
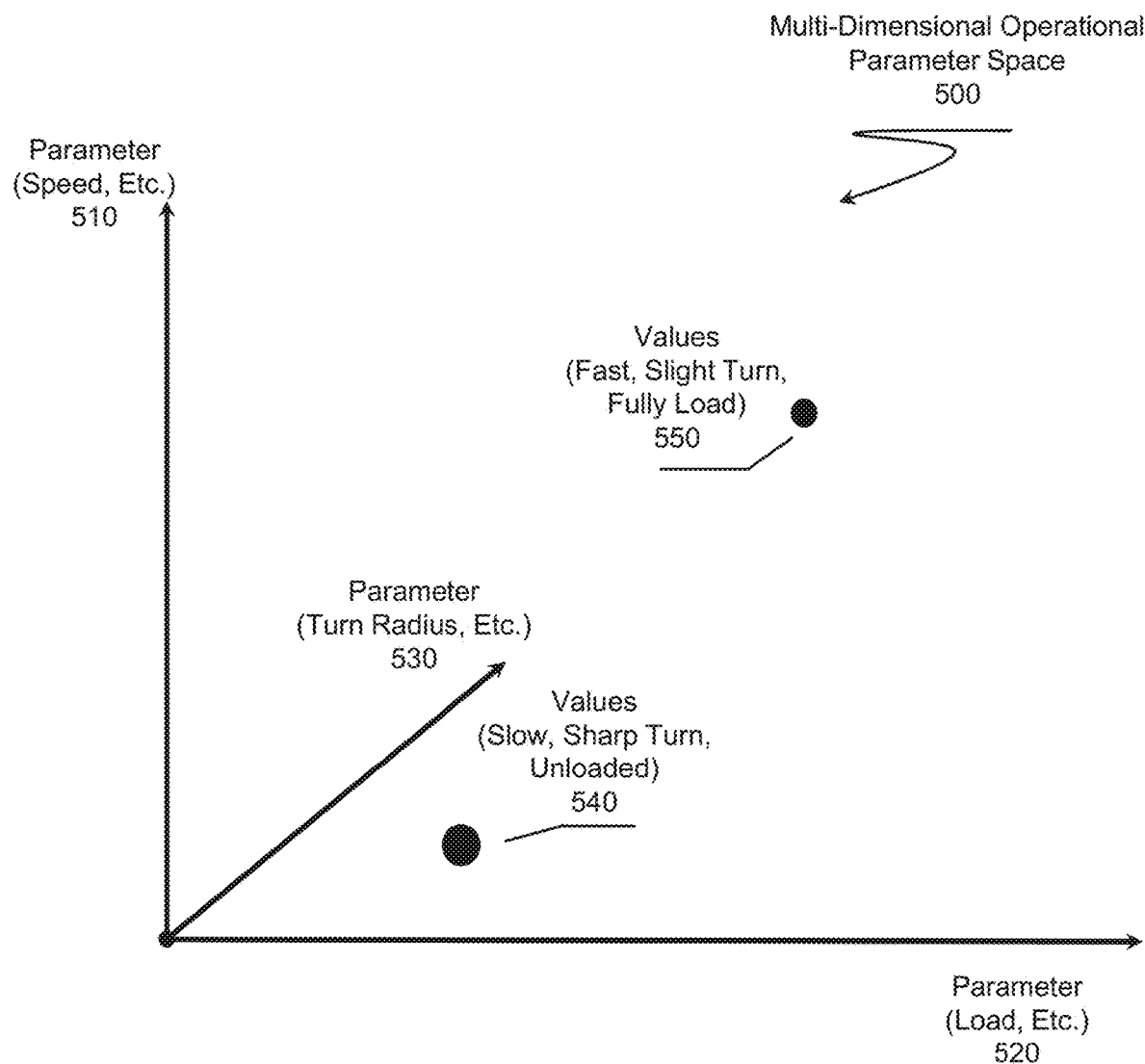
FIG. 5A provides an overview of a multi-dimensional operational parameter space having two defined points in the space.

FIG. 5A provides additional details regarding the nature of the operational parameters of a vehicle, which may influence the contact patch state of one or more contact patches. The illustrated graph provides a schematic of a multi-dimensional operational parameter space 500 where each dimension represents one type of operational parameter, which may have a corresponding value (e.g., zero, 100 Kph, 1000 Kg, etc.). For example, the vertical axis 510 represents speed, the horizontal axis 520 represents loading (e.g., weight, etc.), and the axis 530 into the page represents turn radius. Space 500 is illustrated with three dimensions for clarity. However, any practical number of dimensions can exist in space 500 and digitally represented in the memory of the computing system. In some cases, the dimensions are continuous; speed may range from 0 to a maximum permitted value for example. However, some parameters might be discrete values; type of tire or number of passengers for example.

Each contact surface may have its own axis in the space. For example, a front wheel might have a turn angle axis in space 500, but the rear wheel might not because rear wheels on the vehicle may not be able to turn. Thus, each wheel might be represented by their own corresponding axis. Some axes may be correlated with each other as well. For example, a differential drive train may cause two axes representing angular velocity of two wheels to be coupled to some degree. While a single multi-dimensional parameter space 500 is illustrated for a single vehicle, it is also possible that each wheel could be represented by its own individual parameter space.

At any given moment, the LSV may be operating at or existing at a specific point in multi-dimensional operational parameter space 500. A specific point in space 500 may be represented by a set of values or a vector data structure corresponding to the parameters in the space. Consider values 550. Values 550 represent point in space 500 where a vehicle may be fully loaded (high on parameter axis 520) and turning slightly (high on the parameter axis 530 due to a large turn radius) and moving fast (high on the parameter axis 510). However, at a different point in time or under different circumstances, the vehicle may exist at a different point in the space represented by values 540. Values 540 euphemistically represent that the vehicle is moving slower (lower on the parameter axis 510), turning sharply (lower on parameter axis 530 due to a small turn radius), and having reduce load (lower on parameter axis 520).

It should be appreciated that the operational parameter values directly or indirectly impact the contact patches of the vehicle, which in turn impacts the operational environment of the vehicle. As discussed with respect to FIGS. 4A and 4B, the contact patch may be highly impactful on the environment (e.g., deep on wet turf, sliding on sand, etc.), or minimally impactful on the environment (e.g., nominal contact with pavement, etc.). Therefore, one aspect of the disclosed inventive subject matter is to ensure that an impact on the environment via the contact patches is improved, preferably toward reducing the impact, especially when shifting from one type of terrain to another as signaled by a change in a terrain attribute.

Figure 5B:
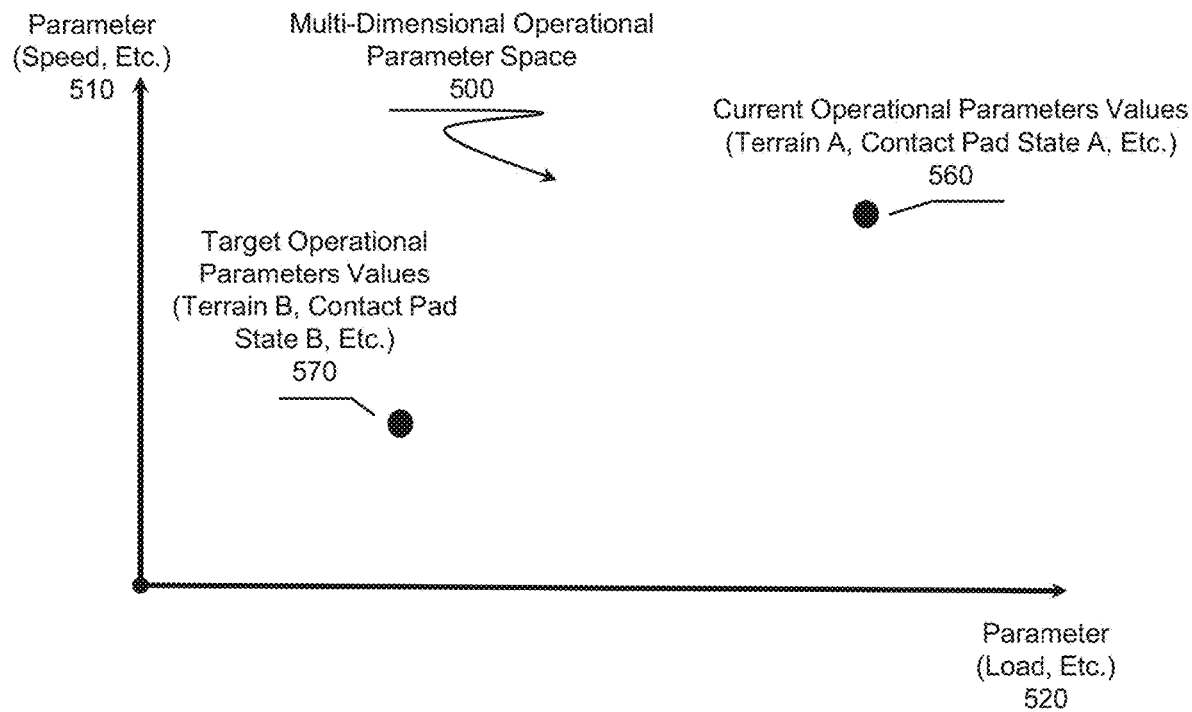
FIG. 5B illustrates current operational parameter values and target operational parameter values along with a path connecting the two value sets.
Figure 5B:
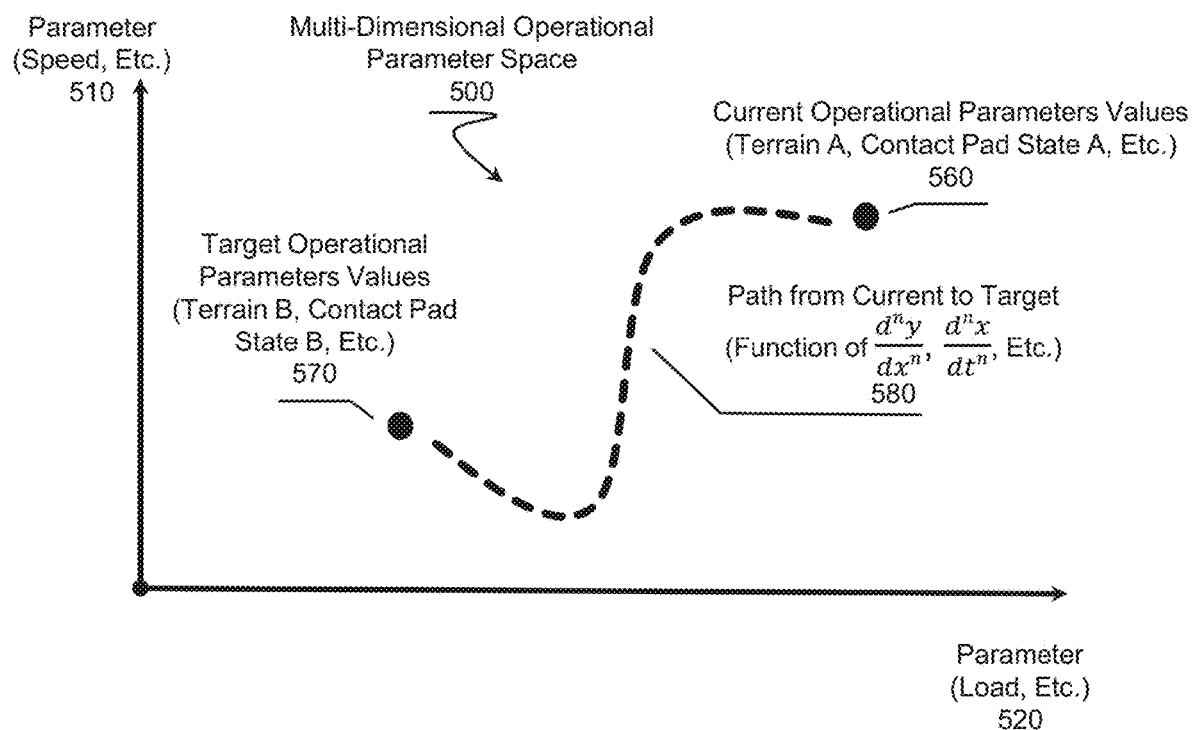

FIG. 5B presents a simplified view of multi-dimensional operational parameter space 500 showing only two dimensions for clarity and ease of presentation. In the example of the top graph, the vehicle is operating at current operational parameter values 560, which relate to a specific type of terrain. However, as a change in the terrain, or an attribute of the terrain, is detected, the vehicle should shift its operational state to target operational parameters values 570 in order for the contact patches (i.e., at least one) of the vehicle to have the appropriate patch attributes in response to the detected change in the terrain attribute. Consider an example of a golf cart as the LSV. A golf cart operating on a paved cart path may be permitted to operate at high speeds and under high weight. Under such conditions contact patches would have significant forward forces (e.g., forward acceleration, etc.) and weight (e.g., downward normal forces, frictional forces, etc.) which would cause the contact patches to be wide and broad, but still have minimal impact on the pavement (i.e., no depth). However, as the cart shifts to turf (i.e., the fairway), the target operational parameters should change to reflect the new terrain. The cart might only be permitted to operate as a slow speed with slight turn radius for example so that the underlying turf is less disturbed. By operating at a slow speed, the contact patch interface with the turf will be more gentle and less prone to slippage, which would otherwise rip the turf. One should note there is no requirement that the current operational parameter values be present in the target operational parameter values.

Turning toward the bottom graph, the vehicular control system generates path 580 in the multi-dimensional operational parameter space 500 from the initial point at current values 560 to a desired point at target values 570 upon detection of the terrain attribute change. Of specific note, path 580 is defined based on derivatives of one operational parameter with respect to another or with respect to time in view that it may take time to shift the vehicle from one operational state to another. While, this may be counter intuitive in view the vehicular controllers can be easily set with new values more appropriate the new terrain, it should be appreciated that the simply changing the operation state of the vehicle can have significant impact on the terrain due to discontinuities at higher order derivatives, especially with respect to time. Returning to the golf cart example, if the speed of the cart is simply changed from a fast speed to a slower speed, the cart will experience sliding without rolling due to change in momentum of the cart, which in turn will likely tear or rip the turf. Thus, the vehicular control system generates path 580 to smooth the transition from one terrain state to another. Said differently, the inventive subject matter is considered to include generating a path 580 that results in at least one appropriate contact patch state targeting a shift in terrain as triggered by the detected change in at least one terrain attribute (e.g., terrain type, condition, texture, slope, tilt, evenness, etc.).

Path 580 may be generated based on the underlying terrain attribute change information. As one or more terrain sensors detect a change or senses a change is about to happen, the control system may consult one or more implementations of algorithms to determine how the generate path 580 from the current set of values to the target values. In some embodiments, the algorithms may include a look-up table. The table or tables may comprise one or more indices, say for example a two-dimensional matrix. One index might be an initial terrain type (e.g., pavement, sand, turf, weeds, gravel, etc.) and the second index can be the expected terrain type (e.g., pavement, sand, turf, weeds, gravel, etc.). The cells of the matrix can include pointers to one or more functions or a set of rules that are designed to generate path 580. While this example is presented with respect to terrain type, such as system can be generalized to other circumstances as well, including terrain condition (e.g., wet, dry, icy, etc.).

The vehicle control system may execute the computer-based functions or rules sets to generate path 580 not only based on the change in terrain, but also on other available vehicular information. For example, the time or distance before or after the change is detected may also contribute to generating path 580. If the change is expected to happen in 10 seconds, then the path 580 may include multiple higher order derivatives to create a smooth transition from current values 560 to target values 570 over the 10 second, while reducing discontinuities with respect to the contact patches or terrain. To be clear, path 580 may include many components including $dx/dy, d^2x/dy^2, d^3x/dy^3, \ldots, d n^{11}x/dy^{11}$, and so on, where dy may include other operational parameters, time, distance or other factors. Further, each component of path 580 may only be relevant for a specific time or distance. Thus, path 580 may comprise multiple "pathlets" that stitch together to give rise to path 580. Each pathlet may represent a small, smooth transition from one point to another. Such pathlets (and path 580) may also comprise other forms of mathematical curves in the space to aid in smooth transitions. Curves may include lines, parabolas, hyperbolas, sinusoidal curves, polynomials, or other curves. Typically, the point where one pathlet couples to another pathlet should be smooth at higher order derivatives for a smooth transition as the terrain changes. Still, in more preferred embodiments, the components of path 580 connect without creating discontinuity in higher order derivatives so the behavior of the contact patches are smooth relative to how they interface with the terrain and especially with respect to shifts in terrain from one type to another.

Figure 5C:
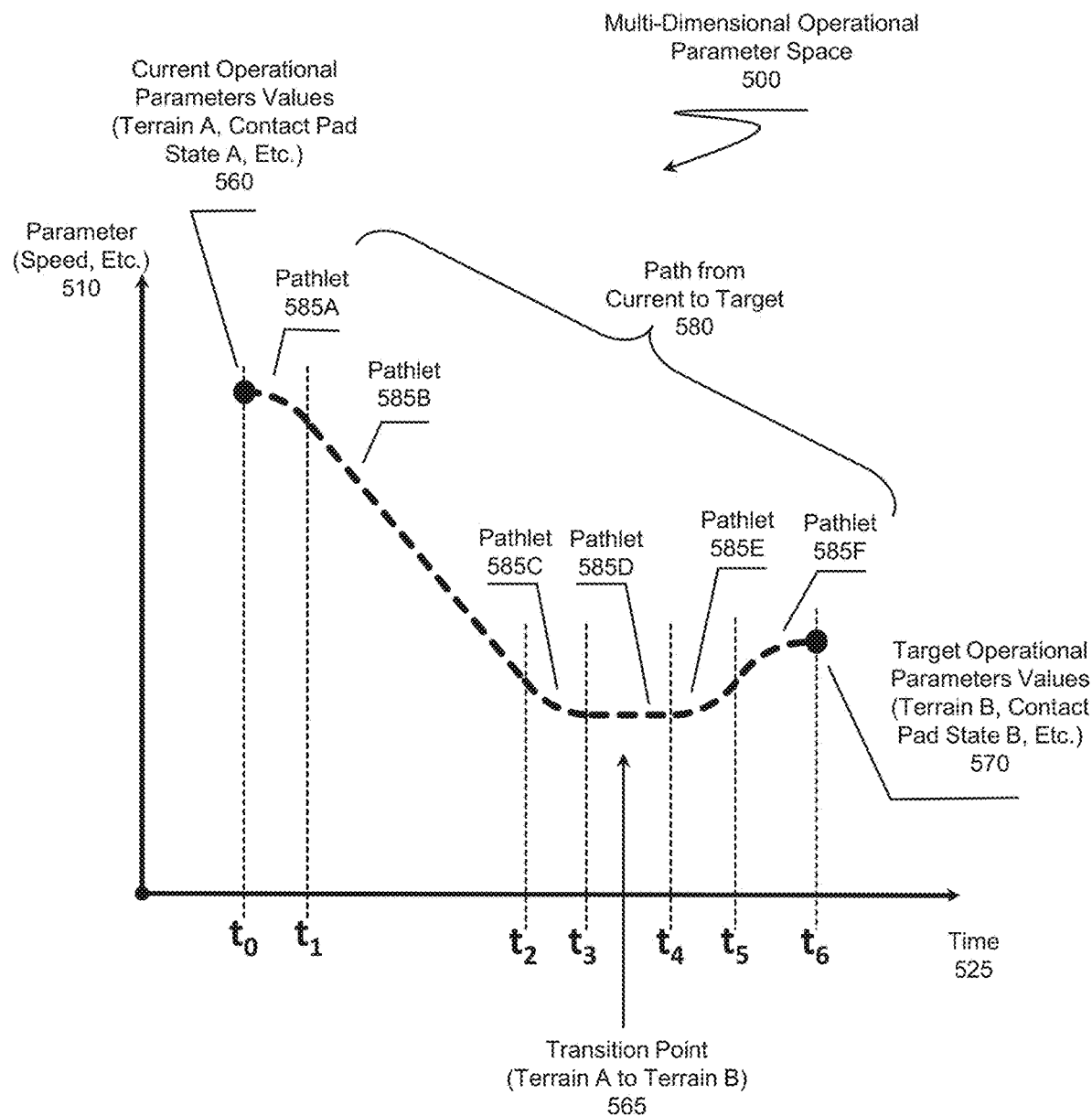
FIG. 5C illustrates pathlets associated with the path connect the operational parameter value sets.

FIG. 5C presents an overview of how one or more pathlets, pathlets 585A through 585F collectively referred to as pathlets 585, may compose one or more of path 580. The example shown presents path 580 with respect to one operational parameter, speed as represented by axis 510 versus time by the time axis 525. This representation is presented for clarity, and one should appreciate that the described concepts of pathlets can also apply to other representations or other operational parameter dimensions with respect to each other.

Path 580 is illustrated as comprising six pathlets that link together from current operational parameter values 560 to target operational parameter values 570. One should note that path 580 has been established to address the transition point 565 from one type of terrain to another. Further, each pathlet is valid or active for a certain amount of time as shown and has different derivative characteristics to address transition point 565. In some embodiments, the transition point 565 may be recognized by processor of a vehicle based on terrain data (e.g., detecting a change of terrain state ahead of the vehicle in a particular course of the vehicle). Starting at time $t_0$, pathlet 585A represents a gradual increase in deceleration of the vehicle until the deceleration becomes constant at time $t_1$. Pathlet 585A represents a case where higher order derivatives, $-d^2x/dt^2$ for example is not constant but is changing. For example, $-d^3x/dt^3$ may be constant, but $-d^2x/dt^2$ is not. Pathlet 585B is linear and illustrates slowing of the vehicle from time $t_1$ to time $t_2$, which requires a constant application of force (e.g., braking, friction, etc.), and where the higher order derivative is constant: $-d^2x/dt^2$ equals a constant value representing braking, for example. Pathlet 585C represents a case where the rate of deceleration is decreased from time $t_1$ to time $t_2$ until a constant speed is achieved in anticipation of a contact patch encountering the actual terrain transition point 565 sometime between time $t_3$ and time $t_4$. Pathlet 585D represents a state where the vehicle is at constant speed (i.e., $d^2x/dt^2$ equal to 0; subject to motors overcoming frictional forces). The vehicular control system has determined that the constant speed is appropriate for the change in terrain from Terrain A to Terrain B at transition point 565. After the transition, pathlet 585E represents a ramp up or increase of acceleration to a higher acceptable speed for Terrain B from time $t_4$ to time $t_5$ and then a gradual decline in acceleration from time $t_5$ to time $t_6$ to the final acceptable speed for Terrain B.

Several items of interest should be appreciated with respect to pathlets 585. Some pathlets have varying higher order derivatives to create smooth transitions from one state to another. Not only does that approach provide a better experience to the operator of the vehicle, but more importantly the smooth transitions may be used to reduce the impact on the underlying terrain, especially at one or more of transition point 565. Further, providing smooth operation at higher order derivatives extends the life of the vehicle or its parts by ensuring the parts do not experience high impulses with respect to stresses, strains, or other forces which could damage the parts. Additionally, while only six pathlets are illustrated, any practical number of pathlets may compose path 580. The start, middle, or end of a pathlet may also serve as a new current operational parameter value set, from which a new path may be generated. For example, while the vehicular control system is executing instructions associated with pathlet 585B, the vehicle's operator may turn away from transition point 565. In response, a new path 580 may be generated to address the predicted deviation; that is the predicted terrain attribute change is no longer valid.

Path 580 may be represented digitally in one or more forms. Of particular note, path 580 may be represented as a set of instructions to one or more vehicular controllers responsible for the operational parameters of the vehicle. For example, path 580 could be represented as an XML or JSON file outlining each component of the path (i.e., pathlets) and what values should exist during the transitions. In other cases, path 580 could be represented as one or more queues, possibly time ordered, of commands to be issued to or executed by the controllers. As the control system reads the top of the queue at the appropriate times, it submits the corresponding commands to the controllers to ensure the path is adhered to, at least to within acceptable tolerances.

One should appreciate that path 580 itself is not just a static construct, but could be dynamic with respect to time or circumstances. At any given point in time, the current operational values of the path 580 may be re-evaluated with respect to the target values so that adjustments may be made accordingly in real-time or near real-time.

Some operational values may not be achievable on path 570. For example, while a heavily loaded, moving vehicle might shift to soft terrain, it's weight might not be able to change to address the new terrain type. In such cases, the rules for governing path generation may include exception handling to exclude, to the extent reasonable, such invariant parameters. However, in other scenarios, perhaps in the case of a delivery vehicle, the vehicle may be stopped on pavement and a notification can be sent to the operator to unload a portion of the vehicle, to redistribute the load, or to request additional vehicle support before the vehicle continues to the new terrain. Such notifications may be displayed on a console of the vehicle, sent to the operator's cell phone, or through other communication channels.

Path 580 is illustrated as a single, curved line to convey the concept that path 580 may take on a complex shape and could take one a wide variety of possible parameter value states as generated from the derivatives. However, one should appreciate that in many situations, the vehicular controllers might not be able to deploy practically the desired values from the path 580 due to the local circumstances (e.g., on slope, unknow terrain type, etc.). Therefore, path 580 may include one or more operational envelopes of acceptability, which represents possible acceptable deviations from the path 580. Such operational envelopes of acceptability could be represented as a set of contours or "tubes" around path 580 in the illustrated graph. The envelopes provide the vehicular control system the ability to fall back to more reasonable operational parameter values in real-time local situations as the control system seeks to move from current values 560 to target values 570. Thus, when path 580 is instantiated in the memory of the vehicular control system, the path object may include one or more envelopes along with rules governing which envelope is active or may be used when exceptions are triggered.

While path 580 is illustrated as a singular path for an LSV, one should appreciate that a vehicle at any given time, might have many paths 580 that are to be used or yet to be used. One reason for this is that vehicles may have more than one contact patch (e.g., one, two, three, four, etc.), one for each wheel, for example. In such cases, there may be a path 580 object instantiated for each wheel. For example, one wheel might be on turf while another wheel is on pavement. Further, a third wheel might be on turf and pavement at the same time where the wheels contact patch extends over both types of terrain. Each contact patch for these wheels may be substantially different from each other and may require completely different paths 580. The vehicular controllers may then control each wheel individually as well as all the wheels collectively, depending on whether the wheels have their own motors and/or brakes.

Further, each wheel may also include the aforementioned envelopes. Additionally, path objects in memory do not necessarily have to be active path objects. Rather, some path objects may be active (i.e., in current use) while other may be inactive (i.e., not yet in use). For example, the vehicular control system may detect an environmental location of the vehicle via use of a GPS sensor. Based on the environmental location, the vehicular control system may consult a map (e.g., Google Maps, Open Street Map, etc.) to determine which types of terrain may be present, or to determine what are the possible weather conditions (e.g., weather.com, etc.). Then, the vehicular control system may pre-load possible paths 580 or path templates that may be useful for possible transitions in the local terrain or changes in local conditions.

In some embodiments, a remote vehicular control server may provide location-based services to the vehicle or a fleet of vehicles that may be bound to a specific campus. In such cases, the vehicular control server can receive the location information from the vehicle or otherwise obtain the location information and then provide path management services to the vehicle based on the location. More specifically, the vehicular control server can translate the location information into the terrain or map information. Of note, the server does not necessarily have to store path information for all areas. Rather the server may tesselate the space into relevant areas of interest. For example, a larger area like a fairway may only require a single area tile, which then may only require a few paths or path templates. However, more complex areas, say a campus, may require a higher level of tessellation with much smaller area tiles to reflect the varied environment. Still further, in view the inventive subject matter is focus on transitions, the server may be constructed to store paths or path templates along transitional areas. One possible technique for tessellation includes the use of S2 cells (see URL s2geometry.io), which provides for tessellating a geographical space at various levels of detail.

Figure 6:
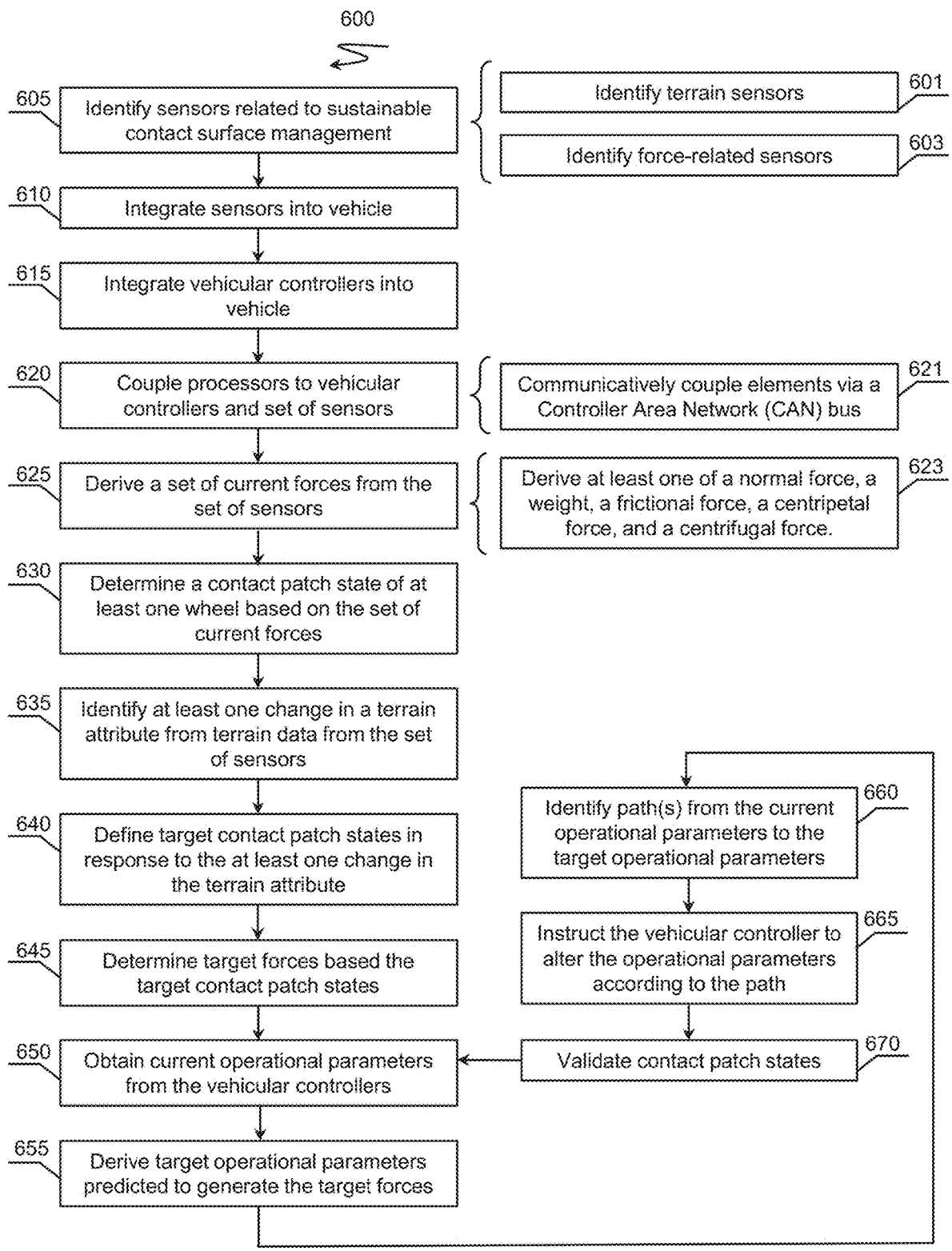
FIG. 6 outlines a method of controlling a vehicle.

FIG. 6 provides an overview of method 600, a method for controlling a vehicle's contact patches' impact on an environment. While some steps may require the order in which they are depicted (e.g., integrating a sensor in the vehicle before using them, etc.), other steps executed by a processor may proceed in any practical order.

Step 605 may occur early on in the development or design of a vehicle and includes identifying sensors related to sustainable contact surface management. While a vehicle may be instrumented with such sensors at a time of manufacture, it is also possible such sensors may be deployed in the vehicle after manufacture, possibly as a field upgrade kit. Of particular note, the sensors may include terrain sensors as suggested by step 601. Terrain sensors provide sensor data that may be translated, directly or indirectly, into one or more terrain types or terrain attributes the reflect the nature of the terrain located about the vehicle. Example terrain sensors may include a digital camera capable of capturing images of local terrain around a vehicle, a LIDAR sensor capable of sensing textures, evenness, or features in the environment, GPS sensors or location sensors which may be used to identify areas of terrains, or other types of sensors that may be used to detect changes in terrains. Additional sensors may include force-related sensors, force sensors for short, as indicated by step 603. Force sensors provide sensor data that may be used, directly or indirectly, to derive a set of forces experienced by the vehicle, which may then be used to estimate or otherwise determine or infer contact patch states. Example sensors that may be used as force sensors include accelerometers, piezoelectric sensors, gyroscopes, inertial measurement units (IMUs), weight scale sensors, or other sensors whose data may be converted to forces experienced by the vehicle or forces relevant to contact patches.

Step 610 includes integrating the sensors into the vehicle. The sensors may be deployed about the vehicle as necessary or desired to detect the various terrain changes or forces. In some embodiment, force sensors may be deployed in the cab of the vehicle for easy access and repair as a single force sensing unit that measures the forces as a whole across the vehicle. However, it is also contemplated that each wheel or wheel well may have its own force sensing package in order to have a higher level of force sensing fidelity for each contact patch. The vehicle may be best served by deploying multiple terrain sensor packages about the vehicle to identify current terrain experienced by each contact patch as well as to identify possible changes to terrain attributes. Thus, for example, cameras or LIDARs may be disposed in wheel wells to observe a current terrain state of a wheel and may be disposed at the four main corners of the vehicle to gain a 360 degree view around the local environment of the vehicle so that the vehicular controller may predict when terrain changes may occur based on the motion of the vehicle.

Step 615 includes integrating one or more vehicular controllers into the vehicle. In most cases, the vehicular controllers are integrated into the vehicle at manufacture time. Still, in some cases, the vehicular controllers may be integrated in the vehicle in the field, possibly as a field upgrade kit. For example, additional battery packs may be added in the field for extending the vehicles range, and corresponding controllers may be coupled to the new battery packs. The vehicular controller may be disposed about the vehicle as practical with respect what they are intended to control.

Step 620 includes coupling one or more processors to the vehicular controllers. The processors may be coupled to the vehicular controllers via one or more digital communication networks. However, it is also possible that some controllers may be coupled to the processors via programmable I/O pins or other direct wired connections or coupled via a shared computer readable memory. In some embodiments, the processors and vehicular controllers may be coupled to each other via a bus, including a Controller Area Network (CAN) bus as suggested by step 621. Still, in some embodiment, the communication network could comprise wireless networks based on one or more of 802.11, WUSB, Zigbee, BlueTooth, or other wireless communication standards. However, wired communication networks are preferred to ensure robustness during use in complex environments.

Beginning with step 625, method 600 focuses on the actual operation of the vehicle in the field. Step 625 includes deriving a set of current forces experienced by the vehicle from data obtained from the set of sensors deployed in and about the vehicle. The set of current forces may be derived directly or indirectly from the sensor data of the forces sensors as discussed with respect to steps 605 or 603 above. Step 625 may be performed continuously by the processor or as necessary, possibly based on triggering events (e.g., leaving an area, entering an area, operator instructions, etc.). For example, in some the forces may be derived at established regular time intervals (e.g., 1 ms, 10 ms, 1 second, etc.) as permitted by the performance of the processor and the data. In other scenarios, if the vehicle is expected to remain at a current state, the forces may remain, more or less constant within an operational envelope. Thus, the force calculation functions may not be necessary. When the processor predicts a possible change, perhaps based on movement toward a different terrain, the processor may activate the function for calculating the forces. There are numerous different types of forces that may be experienced by the vehicles as derived from the force sensor data, examples include normal forces experienced at each contact patch, a weight of the vehicle, a weight distribution around the vehicle, frictional forces at each contact patch, centrifugal or centripetal forces due to turning, or other forces as suggested by step 623.

Step 640 leverages the derived forces in determining one or more contact patch states of the wheels based on the current forces. The contact patch states may include the physical dimensions of the contact patch, weight or weight distribution across the contact patch, or other features derivable from the forces. Still, the contact patch states can include other information beyond those derived from the current forces. Additional information can include the terrain type experienced by the contact patch, terrain conditions (e.g., dry, loose, wet, muddy, etc.), geographic location, direction of movement of the contact patch, or other information that may be used to characterize the contact patch. As discussed above, each contact patch may be significantly different from other contact patches in the vehicle. Therefore, each contact patch state may be different and instantiated in the memory of the vehicular control system as individual manageable or modeled digital objects.

Step 635 includes identifying one or more change in at least one terrain attribute (e.g., change in terrain type, change in terrain condition, change in terrain texture, etc.) based on the sensor data from the terrain sensors. Step 635, for example, could be executed by the processor substantially at the same time as steps 625 or 630. As the processor observes terrain sensor data, it may translate the terrain sensor data, directly or indirectly, into a change in terrain attribute. For example, digital cameras may observe the surrounding area and use image processing techniques to recognize features or textures of the terrain. OpenCV, an open-source computer vision package, offers multiple implementations of image processing algorithms that may be used for observing changes in terrain from digital image data. Further, GPS information may be used to identify a specific location, which in turn may be mapped to a specific terrain type. One should appreciate that a change in terrain attribute can be a current change or a predicted change based on the motion or other changes in the vehicle.

The terrain attribute change may be a change detected in the past, a change that is presently taking place, or a predicted future change. A past change is relevant in several different ways. In some cases, a first vehicle in a group of vehicles (e.g., convoy, fleet, service vehicles, etc.) operating in the same environment might detect a change that has taken place. It may inform the other vehicles in the group that they may also encounter the change in the terrain attribute, possibly via a network (e.g., connection to group server, wireless mesh network, etc.). Further, a change might be detected at a front set of wheels, which likely might be relevant to a rear set of wheels relative to a direction of motion where the rear set of wheels may experience the change in the near future. A present change represents a change that may be occurring at a particular wheel or even at a specific contact patch itself. Future changes may be predicted based on known terrain information (e.g., GPS, maps, etc.) or based on observed terrain that the vehicle may be approaching.

Step 640 includes defining one or more target contact patch states in response to at least one detected terrain attribute change. The target contact patch states represent the nature of the contact patches should have during a transition from a terrain state to another, or should have when the contact patch find itself in the new terrain circumstances. As discussed above, the contact patch states may comprise templates that may be fleshed out based on local information. The template may be obtained by using the change in the terrain attribute as an index into a template library. The change in terrain attribute may be represented in multiple ways including: a new terrain type identifier, a terrain condition identifier, a delta in a terrain value (e.g., degree of wetness, looseness of terrain material, etc.), or other types of quantified terrain attribute change values. Thus, the target contact patch states can be quantified as a goal for the vehicular control system to achieve to minimize impact on the terrain, especially during a transition. The target contact patch states may include dimensions (e.g., H, W, D, etc.), target speed, allowable turn radius, patch direction or movement, or other contact patch values. In some embodiments the target contact patch states may also include target contact patch state criteria that defines when the contact patch state does indeed or does not achieve the goals of the target contact patch state. Thus, the target contact patch state does not necessarily have to be a rigid set of constraints, but may represent a flexible set of constraints subject to the requirements of reducing impact on the terrain, especially when experiencing a change in terrain attribute.

Step 645 comprises determining target forces that would be desirable or required to achieve the target contact patch states. The target forces represent the forces that vehicle should experience to ensure the target contact patch states are generated by the vehicle. The target forces may be under control of the vehicle control system while other forces (e.g., ambient forces) may be less controlled or not under control of the vehicular control system. Forces under control of the vehicular control system may include speed, braking, charging, turning radius, air pressure, or other factors, which may be manageable by corresponding controllers. Forces that might not be under control of the vehicular control system could include weight. In such cases, the vehicle control system may be required to notify an operator the vehicle so that the operator or other entity may affect a desired change.

Step 650 includes obtaining one or more operational parameter values from the vehicular controllers or from other sources (e.g., GPS sensor, onboard memory, remote server information, etc.). The current operational parameter values can be considered to represent how the vehicle is currently operating and consider to relate to the current contact patch states. Said differently, the current operational parameter values represent a starting point from which the vehicle should shift to achieve it target states and as discussed with respect to FIG. 5B (bottom graph).

Step 655 includes deriving target operational parameter values predicted to generate the target forces. For example, if the target operational parameters require a lower speed, the target forces will include a force necessary to create deceleration (e.g., braking, regenerative braking, etc.). While a shift in speed is straight forward, a force is still necessary to change the speed. A deceleration force necessary to slow the vehicle may still have an impact on the nature of the contact patches, which in turn impact the environment. The target forces may be calculated or otherwise derived based on the target operational parameter values via one or more implementations of force calculating functions executed by the processor.

At this point, the current operational state of the vehicle is known, and the target operational state of the vehicle is determined. Therefore, method 600 may proceed with step 660 which includes identifying a path from the current operational parameter values in the multi-dimensional parameter space to the target operational parameter values. Of particular note, the path preferably is defined based on one or more derivatives of operational parameters with respect to each other or with respect to time. Paths determined using derivatives ensure the change in operational state of the vehicle over time as it transitions from one terrain type or terrain condition to another occurs smoothly and especially occurs with reduced impact on the terrain. Thus, depending on the specific type of impact to be reduced, the derivatives may include first order, second order, third order, or even higher order derivatives. The derivatives aid in smoothing out discontinuities from one state to another. For example, a change of the speed of a vehicle from 20 kph to 10 kph can happen quickly (e.g., large force to decelerate quickly) via a single application of braking. However, such a quick application of force, braking in this case, can rip or otherwise disturb the terrain. Thus, the path can include slower application of forces to reduce the impact on the terrain. Further the path may include changes in force (e.g., derivatives of acceleration) to smooth transitions. Still further, the path may include multiple component "pathlets" that combine to together to give rise to the complete path from the current operational values to the target or final operational values.

In some embodiments, the path or pathlets may also include target contact patch states for each portion of the path. Such an approach is advantageous because it permits the vehicular control system to validate contact patch states are in fact proper for each point along the path and to ensure the goals of the transition caused by the change in terrain attribute are being met.

Step 665 includes sending instructions to one or more vehicular controllers to alter the operational parameter values of the vehicle according to the path. One should appreciate that sending instructions to the vehicular controller may not be a one-and-done step. Rather, it may include sending multiple commands to the vehicular controllers over time so that the vehicle in aggregate follows the path, and thereby generates the desired target forces to give rise to the target contact patch states, where the system may use target force criteria to determine if the vehicle is meeting its goals. Such target force criteria may be derived based on one or more empirically derived criterion. Still further the commands sent to the vehicular controllers may be a continuous or near continuous stream of commands. While each vehicular controller may be in control of a particular portion of the vehicle (e.g., motors, brakes, tire pressure, etc.), in some embodiments a vehicular controller might control multiple elements of the vehicle, or the core processing unit of the vehicle control system itself might control all the elements of the vehicle.

During or after instructions are sent to the vehicular controllers, the vehicle control system may also attempt to validate the contact patch states as suggested by step 670. For example, once the target operational parameter values are achieved, at least within acceptable tolerances or operational envelopes, the vehicular control system may observe via sensors (e.g., cameras, piezoelectric sensors, LIDAR, radar, etc.) the actual contact patch state of the vehicles. If the contact patch states satisfy the contact patch target state criteria for the target contact patch states, method 600 may be complete. Still, if the contact patch states fail to satisfy the contact patch state criteria, then method 600 may repeat at least steps 650 through 670 again. While this simple example applies at the end of the path, one should appreciate that step 670 may also be executed in a continuous or near continuous manner as the vehicle control systems adjusts the operational parameters of the vehicle along the path. Thus, the vehicle control system may loop through steps 650 through 670 in near real-time or in real-time.

The above discussion mainly relates to mitigating the impact that a vehicle has on the environment, especially on terrain in the environment as the vehicle detects changes in the terrain. Interestingly, there are circumstances where the reverse may also be true. Thus, the inventive subject matter is considered to include use cases where the contact patches may have defined increased impact on the terrain. Said differently, use cases include scenarios where the contact patches should satisfy contact patch state criteria in a general sense rather than in only having reduced impact.

Consider an example of a lawn mower. A lawn mower may have two different requirements competing at the same time. First, the front wheels of the mower may be required to have minimal impact on a lawn to ensure the grass blades are properly available to the cutting blade. Second, the rear wheels may require a stronger grip (i.e., larger, slow moving contact patch) on the mowed portion of the lawn. In the case of the latter, the rear wheels may have a larger impact on the terrain but not necessarily damaging the trimmed grass.

Another example of a use case where higher impact may be desired includes use of farm equipment, say plows, harrows, seeders, tractors, and the like. Rather than just focusing on the contact patch of a wheel, farm equipment control systems may also observe the contact patches or operating area of the equipment itself to ensure the equipment is indeed preparing the soil properly. In such cases, computer vision techniques may be used to ensure seed rows are planted properly or with proper density, plowed rows aligned correctly, or for other purposes. As the equipment operates, the vehicular control system can adjust the operational parameters of the equipment to ensure desire contact patch states are maintained.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . . and N, the text should be interpreted as requiring only one element from the group, not A plus N, or B plus N, etc.

What is claimed is:

1. A vehicular control system comprising:
   a plurality of terrain sensors;
   a plurality of force sensors;
   a set of vehicular controllers governing operational parameters of a vehicle, wherein the operational parameters exist a multi-dimensional operational parameter space;
   at least one computer-readable memory storing software instructions; and
   at least one processor coupled with the plurality of terrain sensors, the plurality of force sensors, the set of vehicular controllers, and the at least one computer-readable memory, wherein the at least one processor performs the following operations upon execution of the software instructions:
      deriving a set of current forces from the plurality of force sensors;
      determining at least one current vehicle contact patch state related to at least one wheel of the vehicle and based at least in part on the set of current forces;
      detecting an imminent change from a first terrain to a second terrain for the vehicle based on terrain data obtained from the plurality of terrain sensors;
      defining a set of target contact patch states based on attributes associated with the second terrain;
      determining a set of target forces that satisfy target force criteria defined based on the set of target contact patch states;
      obtaining a set of current operational parameter values from the set of vehicular controllers;
      deriving a set of target operational parameter values predicted to generate the set of target forces, wherein the set of target operational parameter values imposes one or more first limits on an operation of the vehicle;
      determining a path in the multi-dimensional operational parameter space from the set of current operational parameter values to the set of target operational parameter values, wherein the path comprises (i) a first section that changes from the set of current operation parameter values to a set of temporary operation parameter values before the vehicle crosses a border between the first terrain and the second terrain, wherein the set of temporary operation parameter values imposes one or more second limits on the operation of the vehicle, (ii) a second section that maintains the set of temporary operation parameter values as the vehicle crosses the border between the first terrain and the second terrain, and (iii) a third section that changes from the set of temporary operation parameter values to the set of target parameter values after the vehicle crosses the border; and
   instructing the set of vehicular controllers to alter the operational parameters of the vehicle according to the path.

2. The system of claim 1, wherein at least two forces in the set of current forces are orthogonal forces.

3. The system of claim 1, wherein set of current forces includes at least one of: a normal force, a weight, a centrifugal force, a centripetal force, or a lift force.

4. The system of claim 1, wherein the set of current forces comprises at least one ambient force.

5. The system of claim 1, wherein the set of current forces comprises at least one controllable force.

6. The system of claim 1, wherein the at least one current vehicle contact patch state comprises at least one of: a contact area, a force differential, a grip, a shape, a shape change, a tilt, a depth, or a volume displacement.

7. The system of claim 1, wherein the defining the set of target contact patch states comprises mapping the attributes of the second terrain to one or more of the set of target contact patch states using at least one of: a look-up table, a hysteresis curve, an implementation of a genetic algorithm, a hash table, or a neural network.

8. The system of claim 1, wherein the operations further comprise validating, based on a set of contact patch state criteria, contact patch states of the vehicle after the instructing the set of vehicular controllers to alter the operational parameters of the vehicle according to the path.

9. The system of claim 8, wherein the operations further comprise iteratively deriving the set of target operational parameter values, identifying the path in the multi-dimensional operational parameter space, and instructing the set of vehicular controllers to alter the operational parameters until the contact patch state criteria is satisfied.

10. The system of claim 1, wherein at least one of the first section or the third section of the path is defined as a function of first order derivatives of the operational parameters.

11. The system of claim 1, wherein at least one of the first section or the third section of the path is defined as a function of second order derivatives of the operational parameters.

12. The system of claim 1, wherein at least one of the first section or the third section of the path is defined as a function of derivatives of the operational parameters, and wherein the derivatives comprise at least one of: a third order derivative, a fourth order derivative, or a fifth order derivative.

13. The system of claim 1, wherein at least one of the first section or the third section of the path is defined as a function of derivatives of the operational parameters, and wherein the derivatives comprise a derivative with respect to time.

14. The system of claim 1, wherein at least one of the first section or the third section of the path is defined as a function of derivatives of the operational parameters, and wherein the derivatives comprise a derivative of a first operational parameter with respect to a second operational parameter of the operational parameters.

15. The system of claim 1, wherein the path comprises an instantiated path object in the at least one computer-readable memory.

16. The system of claim 1, wherein the path operates as a function of time.

17. The system of claim 1, wherein at least one of the first section or the third section of the path is defined based on derivatives of the set of current operational parameter values.

18. The system of claim 1, wherein at least one of the first section or the third section of the path is defined based on derivatives of the set of target operational parameters values.

19. The system of claim 1, wherein the path is associated with a predetermined range of deviations.

20. The system of claim 1, wherein the target force criteria comprise at least one a priori defined criterion with respect to the set of target contact patch states.

21. The system of claim 20, wherein the a priori defined criterion includes at least one empirically derived criterion.

22. The system of claim 1, wherein the operational parameters of the multi-dimensional operational parameter space comprise one or more of: a speed, a velocity, an acceleration, a turn radius, a tire pressure, a brake pressure, or a weight.

23. The system of claim 1, wherein the set of vehicular controllers includes at least one of: a motor controller, an air pressure controller, a braking controller, or a steering controller.

24. The system of claim 1, further comprising a digital communication bus coupling the at least one processor with the plurality of force sensors, the plurality of terrain sensors, the set of vehicular controllers, and the at least one computer-readable memory.

25. The system of claim 24, wherein the digital communication bus comprises a wireless network.

26. The system of claim 24, wherein the digital communication bus comprises a wired network.

27. The system of claim 24, wherein the digital communication bus comprises a CAN bus.

* * * * *